(12) United States Patent
Park

(10) Patent No.: US 8,037,490 B2
(45) Date of Patent: Oct. 11, 2011

(54) SPINDLE MOTOR

(75) Inventor: Jae Hyun Park, Ansan-si (KR)

(73) Assignee: LG Innotek Co., Ltd., Seoul (KR)

( * ) Notice: Subject to any disclaimer, the term of this patent is extended or adjusted under 35 U.S.C. 154(b) by 513 days.

(21) Appl. No.: 12/353,613

(22) Filed: Jan. 14, 2009

(65) Prior Publication Data
US 2009/0183191 A1 Jul. 16, 2009

(30) Foreign Application Priority Data
Jan. 14, 2008 (KR) .................... 10-2008-0003857

(51) Int. Cl.
*G11B 17/03* (2006.01)
(52) U.S. Cl. .............. 720/696; 720/697; 720/704
(58) Field of Classification Search .......... 720/696, 720/697, 704
See application file for complete search history.

(56) References Cited

U.S. PATENT DOCUMENTS

| 7,434,240 | B2 * | 10/2008 | Yoo et al. ............ 720/702 |
| 7,979,874 | B2 * | 7/2011 | Park et al. ............ 720/714 |
| 2011/0167438 | A1 * | 7/2011 | Ryu ............ 720/697 |

* cited by examiner

*Primary Examiner* — Connie Yoha
(74) *Attorney, Agent, or Firm* — Saliwanchik, Lloyd & Eisenschenk

(57) ABSTRACT

A spindle motor is provided. The spindle motor includes a rotation shaft rotatably installed, a stator around the rotation shaft, a rotor coupled to the rotation shaft, a turntable rotated with the rotation shaft, and a center guide member comprising a body coupled to the rotation shaft and a support rim extending from the body, the support rim can comprise a first sloped surface extending from an outer surface of the body and making an angle of about 47° to 53° with an imaginary vertical line parallel with the rotation shaft, and a second sloped surface extending from an end of the first sloped surface and making an angle of about 16° to 22° with an imaginary vertical line parallel with the rotation shaft.

20 Claims, 3 Drawing Sheets

SPINDLE MOTOR

CROSS-REFERENCE TO RELATED APPLICATION

The present application claims the benefit under 35 U.S.C. §119(e) of Korean Patent Application No. 10-2008-0003857, filed Jan. 14, 2008, which is hereby incorporated by reference in its entirety.

BACKGROUND

The present disclosure relates to a spindle motor.

Spindle motors are used to rotate disks such as compact disks (CDs) or blue-ray disks (BDs) for reading data from the disks or writing data to the disks.

Generally, the distance between tracks of a CD is about 1.7 µm, and the distance between tracks of a BD is about 0.7 µm. That is, a BD can store data more densely than a CD.

In the case where tracks of a disk are densely arranged like those of a BD, the disk should be supported and rotated more firmly and precisely by a spindle motor.

BRIEF SUMMARY

Embodiments provide a spindle motor.

Embodiments also provide a spindle motor that can support a disk firmly and precisely.

In one embodiment, a spindle motor includes: a rotation shaft rotatably installed; a stator around the rotation shaft; a rotor coupled to the rotation shaft; a turntable rotated with the rotation shaft; and a center guide member comprising a body coupled to the rotation shaft and a support rim extending from the body, wherein the support rim comprises: a first sloped surface extending from an outer surface of the body and making an angle of about 47° to 53° with an imaginary vertical line parallel with the rotation shaft; and a second sloped surface extending from an end of the first sloped surface and making an angle of about 16° to 22° with an imaginary vertical line parallel with the rotation shaft.

In one embodiment, a spindle motor includes: a rotation shaft rotatably installed; a stator around the rotation shaft; a rotor comprising a rotor yoke coupled to the rotation shaft; a turntable rotated with the rotation shaft; and a center guide member comprising a body coupled to the rotation shaft and a support rim extending from the body, wherein the support rim comprises: a first sloped surface extending from an outer surface of the body and making an angle of about 53° to 59° with an imaginary vertical line parallel with the rotation shaft; a second sloped surface extending from an end of the first sloped surface and making an angle of about 8° to 14° with an imaginary vertical line parallel with the rotation shaft; and a third sloped surface extending from an end of the second sloped surface and making an angle of about 16° to 22° with an imaginary vertical line parallel with the rotation shaft.

The details of one or more embodiments are set forth in the accompanying drawings and the description below. Other features will be apparent from the description and drawings, and from the claims.

DETAILED DESCRIPTION

A spindle motor will now be described in detail with reference to the accompanying drawings, in which exemplary embodiments are shown.

Figure 1:
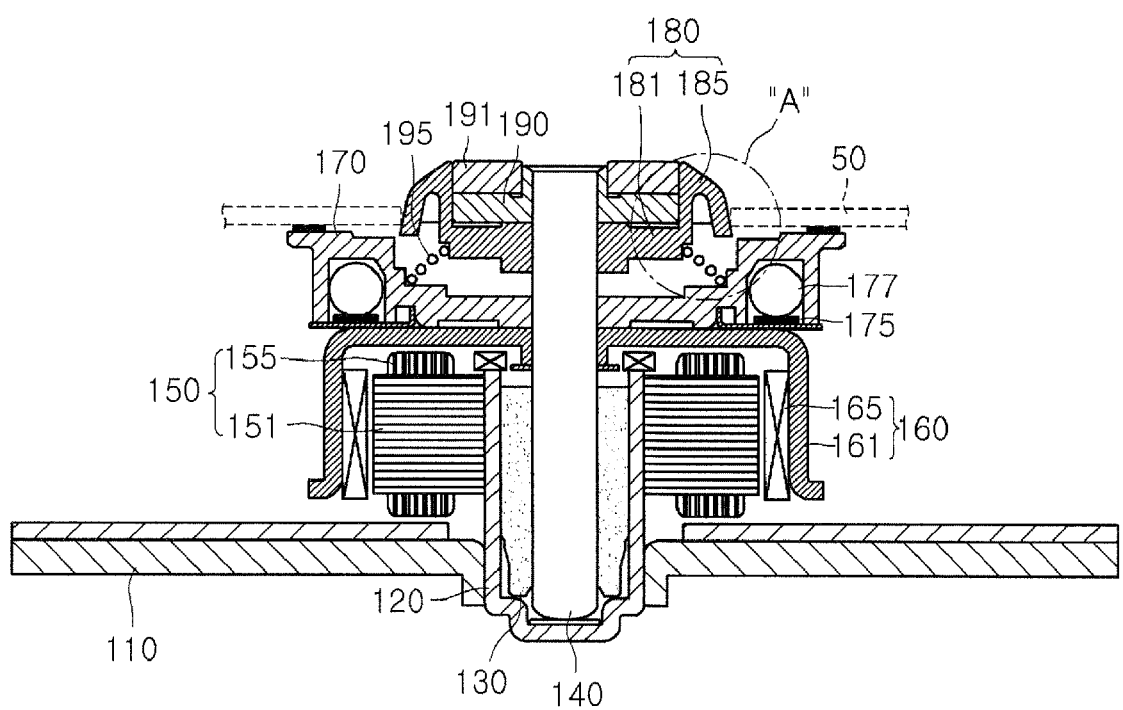
FIG. 1 is a cross-sectional view illustrating a spindle motor according to a first embodiment.
Figure 2:
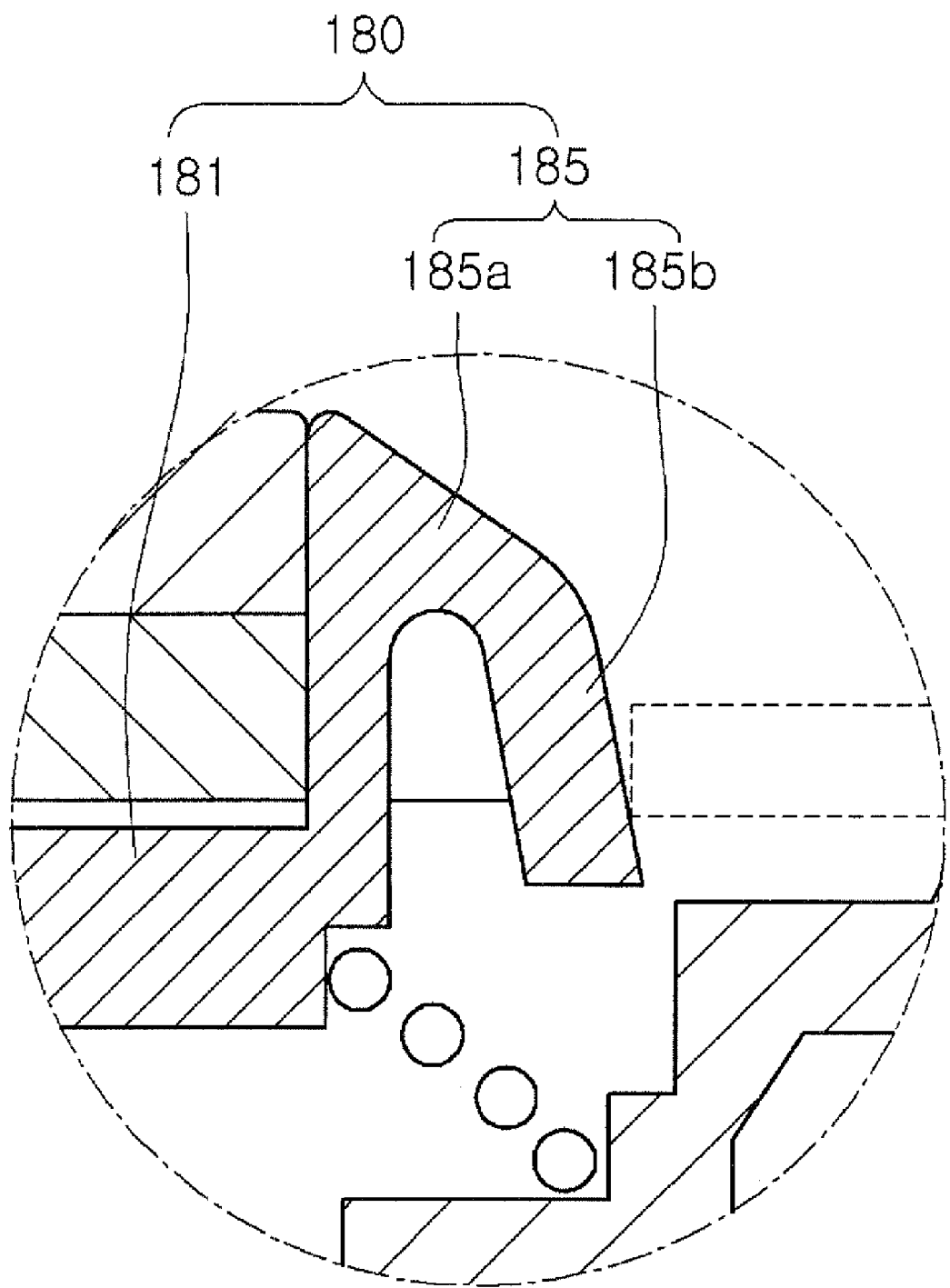
FIG. 2 is an enlarged view of portion "A" of FIG. 1.

FIG. 1 is a cross-sectional view illustrating a spindle motor according to a first embodiment, and FIG. 2 is an enlarged view of portion "A" of FIG. 1.

Referring to FIGS. 1 and 2, the spindle motor of the first embodiment includes a base 110 and a bearing housing 120 disposed in a direction perpendicular to the base 110.

The bearing housing 120 has an opened top side and a closed bottom side, and the bearing housing 120 is coupled to the base 110 in a manner such that the outer surface of the bearing housing 120 is supported by the base 110.

A bearing 130 is fixed to the inside of the bearing housing 120, and a lower portion of a rotation shaft 140 is rotatably supported by the bearing 130. A stator 150 is fixed to the bearing housing 120, and a rotor 160 is fixed to the rotation shaft 140. The rotor 160 rotates together with the rotation shaft 140 by reaction with the stator 150.

The stator 150 includes a core 151 fixed to the outer surface of the bearing housing 120, a coil 155 wound around the core 151. The rotor 160 includes a rotor yoke 161 fixed to a portion of the rotation shaft 140 exposed from the top side of the bearing housing 120, and magnets 165 fixed to the inner surface of the rotor yoke 161 and facing the stator 150.

Therefore, when a current is supplied to the coil 155, the rotor 160 is rotated by an electromagnetic force generated between the coil 155 and the magnets 165, and thus the rotation shaft 140 coupled to the rotor 160 is also rotated.

A turntable 170 on which a disk 50 is loaded and supported is coupled to the rotation shaft 140 so that the turntable 170 can be rotated together with the rotation shaft 140.

A center guide member 180 made of a synthetic resin is coupled to an outer surface portion of the rotation shaft 140 exposed above the turntable 170. The center guide member 180 is vertically movable on the rotation shaft 140. The center guide member 180 is moved downward when the disk 50 is placed, and the downwardly moving length of the center guide member 180 is varied according to the inner diameter of the disk 50.

A bush 190 is coupled to an outer surface portion of the rotation shaft 140 exposed above the center guide member 180, so as to inhibit the center guide member 180 from departing from the top end of the center guide member 180, and a clamp magnet 191 is disposed above the bush 190.

The bush 190 is also used as a back yoke providing a magnetic field passage for the clamp magnet 191, and the clamp magnet 191 may be attached to a clamp (not shown) of a set such as a personal computer (PC) to which the spindle motor is installed so that the disk 50 can be supported more firmly.

The bush 190 and the clamp magnet 191 are disposed inside the center guide member 180, and side surfaces of the bush 190 and the clamp magnet 191 are surrounded by the center guide member 180.

An elastic member 195 is disposed between the turntable 170 and the center guide member 180. The elastic member 195 elastically supports the center guide member 180 in the center-axis and radial directions of the rotation shaft 140 so as to make the center guide member 180 coaxial with the rotation shaft 140 and allow the center guide member 180 to support the disk 50 at a proper height.

The center guide member 180 includes a cylindrical body 181 and a support rim 185 that are formed in one piece. The body 181 is coupled to the outer surface of the rotation shaft 140 and is vertically movable on the outer surface of the rotation shaft 140, and the support rim 185 is sloped downward from an upper outer surface of the body 181 toward the turntable 170.

When the disk 50 is loaded on the turntable 170, the support rim 185 guides the disk 50 to the turntable 170, and at the same time, the support rim 185 makes contact with the inner surface of the disk 50 to make the disk 50 loaded on the turntable 170 concentric with the rotation shaft 140.

In the spindle motor of the current embodiment, the support rim 185 is multiply bent and sloped so that even when the disk 50 is put on the support rim 185 at an oblique angle with the turntable 170, the disk 50 can be loaded on the turntable 170 with the entire bottom surface of the disk 50 being in contact with the turntable 170.

In detail, the support rim 185 includes a first sloped surface 185a and a second sloped surface 185b. The first sloped surface 185a extends downward from an upper outer surface of the body 181 and makes an angle of about 47° to 53° with an imaginary vertical line parallel with the rotation shaft 140, and the second sloped surface 185b extends downward from a lower end of the first sloped surface 185a and makes an angle of about 16° to 22° with an imaginary vertical line parallel with the rotation shaft 140.

For example, the first sloped surface 185a may make an angle of about 50° with an imaginary vertical line parallel with the rotation shaft 140, and the second sloped surface 185b may make an angle of about 19° with an imaginary vertical line parallel with the rotation shaft 140.

Therefore, if the disk 50 is put on the support rim 185 at an inclined angle with the turntable 170, a lower inner edge portion of the inclined disk 50 is abutted against a boundary surface between the first and second sloped surfaces 185a and 185b. That is, since the lower inner edge portion of the inclined disk 50 is abutted against the boundary surface between the first and second sloped surfaces 185a and 185b, an upper inner edge portion of the inclined disk 50 is moved downward so that the disk 50 can be parallel with the turntable 170. After the disk 50 becomes parallel with the turntable 170, the disk 50 moves downward along the second sloped surface 185b onto the turntable 170.

Therefore, the entire bottom surface of the disk 50 can make contact with the turntable 170 when the disk 50 is loaded on the turntable 170. That is, the disk 50 loaded on the turntable 170 can be parallel with the turntable 170.

Balls 177 are disposed at the turntable 170 for correcting eccentric rotation of the turntable 170, and a felt 175 is disposed at the turntable 170 to decelerate the balls 177 rapidly when rotation of the turntable 170 is stopped.

Figure 3:
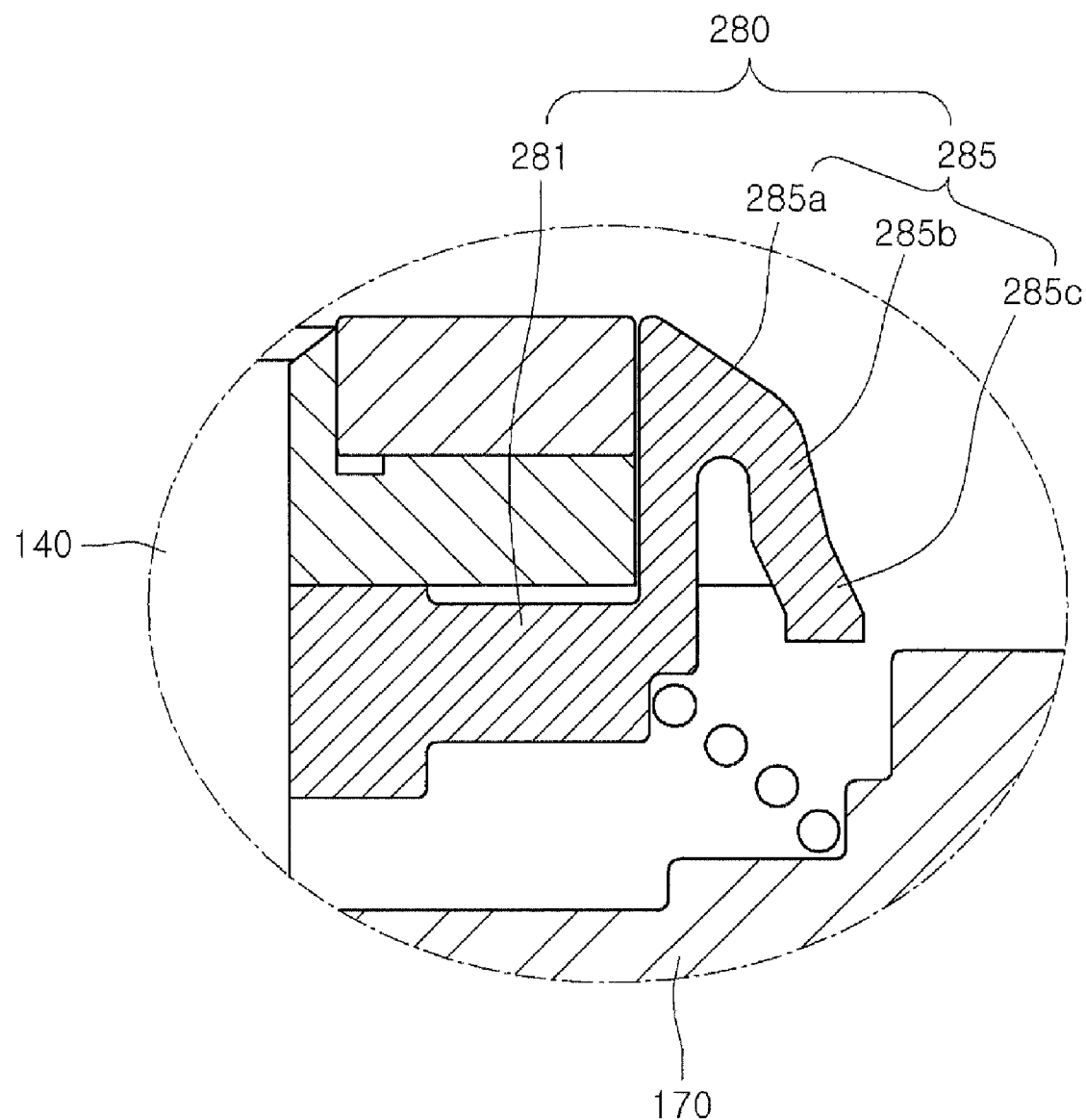
FIG. 3 is a view for explaining a spindle motor according to a second embodiment.

FIG. 3 is a view for explaining a spindle motor according to a second embodiment.

In FIG. 3, only a portion of the spindle motor of the second embodiment corresponding to portion "A" of FIG. 1 is illustrated on an enlarged scale.

Referring to FIG. 3, a support rim 285 of a center guide member 280 includes a first sloped surface 285a, a second sloped surface 285b, and a third sloped surface 285c. The first sloped surface 285a extends downward from an upper outer surface of a body 281 of the center guide member 280 toward a turntable 170 and makes an angle of about 53° to 59° with an imaginary vertical line parallel with a rotation shaft 140. The second sloped surface 285b extends downward from a lower end of the first sloped surface 285a and makes an angle of about 8° to 14° with an imaginary vertical line parallel with the rotation shaft 140. The third sloped surface 285c extends downward from a lower end of the second sloped surface 285b and makes an angle of about 16° to 22° with an imaginary vertical line parallel with the rotation shaft 140.

Therefore, if a disk 50 is put on the support rim 285 at an inclined angle with the turntable 170, a lower inner edge portion of the inclined disk 50 is abutted against a boundary surface between the first and second sloped surfaces 285a and 285b, and thus an upper inner edge portion of the inclined disk 50 is moved downward so that the disk 50 can be parallel with the turntable 170. After the disk 50 becomes parallel with the turntable 170, the disk 50 moves downward along the second and third sloped surfaces 285b and 285c onto the turntable 170.

For example, the first sloped surface 285a may make an angle of about 56° with an imaginary vertical line parallel with the rotation shaft 140, the second sloped surface 285b may make an angle of about 11° with an imaginary vertical line parallel with the rotation shaft 140, and the third sloped surface 285c may make an angle of about 19° with an imaginary vertical line parallel with the rotation shaft 140.

As described above, according to the embodiments, the center guide member of the spindle motor, which is used to support a disk and guide the disk to the turntable, is formed in one piece by using a synthetic resin, so that the spindle motor can be manufactured with low costs.

Furthermore, the support rim of the center guide member has a plurality of sloped surfaces. Therefore, even when a disk is put on the support rim at an inclined angle with the turntable, a side of the disk is abutted against the boundary surface between first and second sloped surfaces of the support rim, and the other side of the disk moves downward to the turntable, so that the disk can become parallel with the turntable.

Therefore, the disk can be loaded on the turntable and be parallel with the turntable, and thus data can be precisely recorded at a desired position of the disk by using an optical pickup or desired data can be precisely reproduced from the disk using the optical pickup. That is, since a disk can be stably supported, product reliability can be improved.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A spindle motor comprising:
   a rotation shaft rotatably installed;
   a stator around the rotation shaft;

a rotor coupled to the rotation shaft;
a turntable rotated with the rotation shaft; and
a center guide member comprising a body coupled to the rotation shaft and a support rim extending from the body, wherein the support rim comprises:
a first sloped surface extending from an outer surface of the body and making an angle of about 47° to 53° with an imaginary vertical line parallel with the rotation shaft; and
a second sloped surface extending from an end of the first sloped surface and making an angle of about 16° to 22° with an imaginary vertical line parallel with the rotation shaft.

2. The spindle motor according to claim 1, further comprising an elastic member disposed between the turntable and the center guide member for supporting the center guide member axially and radially.

3. The spindle motor according to claim 1, further comprising a bush coupled to the rotation shaft for inhibiting the center guide member from departing from the rotation shaft.

4. The spindle motor according to claim 3, wherein the bush is disposed inside the center guide member.

5. The spindle motor according to claim 3, wherein the center guide member surrounds a side surface of the bush.

6. The spindle motor according to claim 3, further comprising a clamp magnet disposed at the bush.

7. The spindle motor according to claim 6, wherein the center guide member surrounds a side surface of the clamp magnet.

8. The spindle motor according to claim 1, wherein the center guide member is movable on the rotation shaft upward and downward for supporting a disk.

9. The spindle motor according to claim 1, wherein the body and the support rim of the center guide member are formed in one piece.

10. The spindle motor according to claim 1, wherein the center guide member is formed of a synthetic resin.

11. The spindle motor according to claim 1, wherein the support rim protrudes outward from an outer surface of the body in a radial direction and extends downward.

12. A spindle motor comprising:
a rotation shaft rotatably installed;
a stator around the rotation shaft;
a rotor coupled to the rotation shaft;
a turntable rotated with the rotation shaft; and
a center guide member comprising a body coupled to the rotation shaft and a support rim extending from the body, wherein the support rim comprises:
a first sloped surface extending from an outer surface of the body and making an angle of about 53° to 59° with an imaginary vertical line parallel with the rotation shaft;
a second sloped surface extending from an end of the first sloped surface and making an angle of about 8° to 14° with an imaginary vertical line parallel with the rotation shaft; and
a third sloped surface extending from an end of the second sloped surface and making an angle of about 16° to 22° with an imaginary vertical line parallel with the rotation shaft.

13. The spindle motor according to claim 12, further comprising:
an elastic member disposed between the turntable and the center guide member for supporting the center guide member axially and radially; and
a bush coupled to the rotation shaft for inhibiting the center guide member from departing from the rotation shaft.

14. The spindle motor according to claim 13, wherein the bush is disposed inside the center guide member.

15. The spindle motor according to claim 13, wherein the center guide member surrounds a side surface of the bush.

16. The spindle motor according to claim 13, further comprising a clamp magnet disposed at the bush.

17. The spindle motor according to claim 16, wherein the center guide member surrounds a side surface of the clamp magnet.

18. The spindle motor according to claim 12, wherein the center guide member is movable on the rotation shaft upward and downward for supporting a disk.

19. The spindle motor according to claim 12, wherein the body and the support rim of the center guide member are formed in one piece.

20. The spindle motor according to claim 12, wherein the center guide member is formed of a synthetic resin.

* * * * *